US008735003B2

(12) United States Patent
Kim et al.

(10) Patent No.: US 8,735,003 B2
(45) Date of Patent: May 27, 2014

(54) LITHIUM-ION BATTERIES HAVING CONFORMAL SOLID ELECTROLYTE LAYERS

(75) Inventors: Gi-Heon Kim, Superior, CO (US); Yoon Seok Jung, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 217 days.

(21) Appl. No.: 13/162,261

(22) Filed: Jun. 16, 2011

(65) Prior Publication Data
US 2011/0311882 A1    Dec. 22, 2011

Related U.S. Application Data

(60) Provisional application No. 61/355,404, filed on Jun. 16, 2010.

(51) Int. Cl.
   H01M 4/58    (2010.01)
   H01M 10/40   (2006.01)
   H01M 2/16    (2006.01)
   B05D 5/12    (2006.01)

(52) U.S. Cl.
   USPC ........... 429/320; 429/231.1; 429/231.3; 429/231.8; 429/304; 427/96.4; 427/115; 427/212

(58) Field of Classification Search
   USPC ............................ 429/231.7, 320
   See application file for complete search history.

(56) References Cited

U.S. PATENT DOCUMENTS

| | | | |
|---|---|---|---|
| 7,070,632 B1 | 7/2006 | Visco et al. | |
| 7,390,591 B2 | 6/2008 | Visco et al. | |
| 7,666,233 B2 | 2/2010 | Visco et al. | |
| 7,771,870 B2 | 8/2010 | Affinito et al. | |
| 7,776,478 B2 | 8/2010 | Klaassen | |
| 7,785,730 B2 | 8/2010 | Affinito et al. | |
| 7,824,806 B2 | 11/2010 | Visco et al. | |
| 8,241,793 B2* | 8/2012 | Zhamu et al. | 429/231.8 |
| 2009/0087751 A1* | 4/2009 | Kondo et al. | 429/309 |
| 2010/0327811 A1 | 12/2010 | Affinito et al. | |
| 2011/0014522 A1 | 1/2011 | Visco et al. | |
| 2013/0089792 A1* | 4/2013 | Issaev et al. | 429/328 |

FOREIGN PATENT DOCUMENTS

KR    10-2005-0009170    1/2005

OTHER PUBLICATIONS

Aaltonen et al, "Lanthanum titanate and lithium lanthanum titanate thin films grown by atomic layer deposition", Journal of Materials Chemistry, 2010, vol. 20, pp. 2877-2881.

Dudney, "Addition of a thin-film inorganic solid electrolyte (Lipon) as a protective film in lithium batteries with a liquid electrolyte", Journal of Power Sources, 2000, vol. 89, pp. 176-179.

Putkonen et al, "Atomic layer deposition of lithium containing thin films", Journal of Materials Chemistry, Dec. 14, 2009, vol. 19, No. 46, pp. 8767-8771.

Song et al., "Stabilization of Thin Film LiCoO2 Electrode by LiPON Coating", 2011, Electrochemical and Solid-State Letters, vol. 14, No. 2, pp. A11-A13.

* cited by examiner

Primary Examiner — John S Maples
(74) Attorney, Agent, or Firm — John C. Stolpa

(57) ABSTRACT

Hybrid solid-liquid electrolyte lithium-ion battery devices are disclosed. Certain devices comprise anodes and cathodes conformally coated with an electron insulating and lithium ion conductive solid electrolyte layer.

20 Claims, 2 Drawing Sheets

LITHIUM-ION BATTERIES HAVING CONFORMAL SOLID ELECTROLYTE LAYERS

CROSS-REFERENCE TO RELATED APPLICATIONS

This application claims the benefit of U.S. Provisional Application No. 61/355,404, filed Jun. 16, 2010, the contents of which are incorporated by reference in their entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

Lithium-ion batteries are receiving attention for use in next generation electric vehicles. However, the batteries still require significant improvement in energy density, cycle life, and safety to accelerate the development and market penetration of lithium-ion battery technologies. In conventional lithium-ion batteries, the porous electrodes, which are constructed of particles of active materials, electronic conductive agents and binders, are wetted by a liquid electrolyte. Prevention of internal electronic path formations (internal short circuits) between the paired electrodes typically depends solely on a porous solid separator, usually a polymer film inserted between the anode and the cathode, which provides spatial and electrical separation of the anode and cathode. Maintaining the mechanical integrity of the separator during exposure to high temperatures, chemical stress and/or mechanical stress is therefore important for the safety of lithium-ion batteries systems. This is not always possible, however, as polymeric separators tend to break down during operating conditions that generate high temperatures, chemical stress and/or mechanical stress. Failure of the polymeric separator typically leads to failure of the battery. Technologies such as ceramic-coated separators, ceramic-polymer composite separators, and multi-layer separators have been developed to compensate for this, however, these safety-oriented separator technologies do not work consistently under various and demanding environmental conditions, especially for large electrode surface area systems.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are disclosed and illustrated in conjunction with systems, tools and methods that are meant to be illustrative, not limiting in scope. In various embodiments, one or more of the above-described problems have been reduced or eliminated, while other embodiments are directed to other improvements.

The present disclosure generally relates to lithium-ion battery devices comprising anodes, cathodes and electrolytes. In various aspects, the present disclosure relates to new hybrid solid-liquid electrolyte lithium-ion battery devices having a conformal coating of an electron insulating and lithium ion conducting solid electrolyte layer deposited directly onto the electrodes. The solid electrolyte layer comprises an additional electrolyte and, in various aspects, is used in addition to a liquid electrolyte. In some embodiments, the battery devices utilize the conformally coated electrodes as the sole means of providing electrical separation between the paired electrodes, and thus do not include a separator between the electrodes. In some embodiments, the battery devices utilize the conformally coated electrodes as a secondary means of providing electrical separation between the paired electrodes, and include a separator between the conformally coated electrodes in addition to the solid electrolyte layers.

The electrodes may include active materials, conductive additives and one or more binders. In various aspects, the electrodes comprise a plurality of small particles that are pressed together to form the electrode. In certain embodiments, the electrodes are preformed and comprise means by which n electrical current can flow either into or away from the electrodes. The means can comprise wires, metal plates, metal filaments, or other standard means of transmitting electrical current. Because the solid electrolyte layers deposited on the electrodes serve as electric insulators, they prevent passage of electrons across them. The solid electrolyte layers thus act as a means of electrical separation between the paired electrodes and mitigate the possibility of internal short circuits that can occur when the electrodes come into contact with each other during operation. In addition, the solid electrolyte layers protect the anode and the cathode from direct contact with a liquid electrolyte, thereby improving the cycle life of the battery and resulting in less heat generation by electrode/electrolyte reactions under severe operating conditions. In some embodiments, a self-limiting deposition process, such as atomic layer deposition (ALD), can be used to deposit the conformal solid electrolyte layers onto the cathode and anode electrodes. In some embodiments, ALD can also be used to deposit the solid conductive electrolyte layer onto preformed electrodes.

In a first aspect, hybrid solid-liquid electrolyte lithium-ion batteries are disclosed. The batteries comprise an anode conformally coated with a first solid electrolyte layer, a cathode conformally coated with a second solid electrolyte layer, and a liquid electrolyte.

In some embodiments, the first and second solid electrolyte layers are electrically insulating and lithium ion conductive.

In some embodiments, the first solid electrolyte layer is deposited onto the anode and the second solid electrolyte layer is deposited onto the cathode by atomic layer deposition.

In some embodiments, the first and second solid electrolyte layers are made from a material selected from beta alumina, $Li^+$—$Na^+$ beta alumina, $(Li,La)_xTi_yO_z$, $Li_{1.3}Ti_{1.7}Al_{0.3}(PO_4)_3$, $Li_{3.6}V_{0.4}Ge_{0.6}O_4$, and combinations thereof.

In some embodiments, the first and second solid electrolyte layers comprise a lithium-containing metal oxide.

In some embodiments, the first and second solid electrolyte layers electrically separate the anode and the cathode.

In some embodiments, the batteries also comprise a polymeric separator between the anode and the cathode.

In some embodiments, the anode comprises graphite and the cathode is made from a material selected from lithium oxide, lithium cobalt oxide, lithium iron phosphate and lithium manganese oxide.

In some embodiments, the liquid electrolyte comprises a lithium salt in an organic solvent and the lithium salt is selected from lithium hexafluorophosphate, lithium hexafluoroarsenate monohydrate, lithium perchlorate, lithium tetrafluoroborate, lithium triflate, and combinations thereof.

In a second aspect, methods of making separator-free lithium ion batteries are disclosed. The methods comprise conformally coating an anode with a first solid electrolyte layer by atomic layer deposition; conformally coating a cathode with a second solid electrolyte layer by atomic layer deposition; and contacting the anode and the cathode with a liquid electrolyte.

In some embodiments, the anode is preformed and comprises an anode current collector and the cathode is preformed and comprises a cathode current collector.

In some embodiments, the first and second solid electrolyte layers are deposited at a thickness of about 1-5 microns.

In some embodiments, the anode is contacted with nitrogen dioxide and trimethyl aluminum prior to atomic layer deposition.

In some embodiments, the first and second solid electrolyte layers comprise a lithium oxide film and the atomic layer deposition comprises contacting the anode and the cathode with lithium tert-butoxide and water.

In some embodiments, the first and second solid electrolyte layers comprise lithium lanthanum titanate.

In some embodiments, the atomic layer deposition comprises alternately contacting the anode and cathode with lithium oxide, lanthanum oxide and titanium dioxide.

In addition to the aspects and embodiments described above, further aspects and embodiments will become apparent by reference to the drawings and by study of the following descriptions.

BRIEF DESCRIPTION OF THE DRAWINGS

Certain embodiments are illustrated in referenced figures of the drawings. It is intended that the embodiments and figures disclosed herein are to be considered illustrative rather than limiting.

DETAILED DESCRIPTION

Embodiments disclosed herein may combine the advantages of liquid electrolyte and solid electrolyte systems to achieve safe and durable hybrid-electrolyte lithium battery systems while maintaining and/or improving electrochemical performances. In various aspects, separator-free hybrid, solid-liquid electrolyte lithium-ion battery devices having conformal solid electrolyte layers deposited on each of the paired electrodes are disclosed. In other aspects, hybrid solid-liquid electrolyte lithium-ion battery devices having both a conformal solid electrolyte layer and a polymeric separator are disclosed. A lithium-ion battery in accordance with embodiments disclosed herein is achieved by applying a conformal coating of an electron insulating and lithium ion conductive solid electrolyte layer directly on the exposed surfaces of the anode and cathode active material, as well as on any conductive additives or binder(s). As used herein, the term "conformal" refers to deposition of a solid electrolyte layer onto an electrode in such a way that the true shape of the electrode is unchanged. In that regard, the shape of each individual particle comprising the electrode is unchanged by the deposition process, as is the overall shape of the electrode itself. Certain embodiments and methods of production of such batteries may be better understood with reference to the Figures and following disclosure.

Separator-Free LIB Systems Having a Solid Electrolyte Layer

Figure 1A:
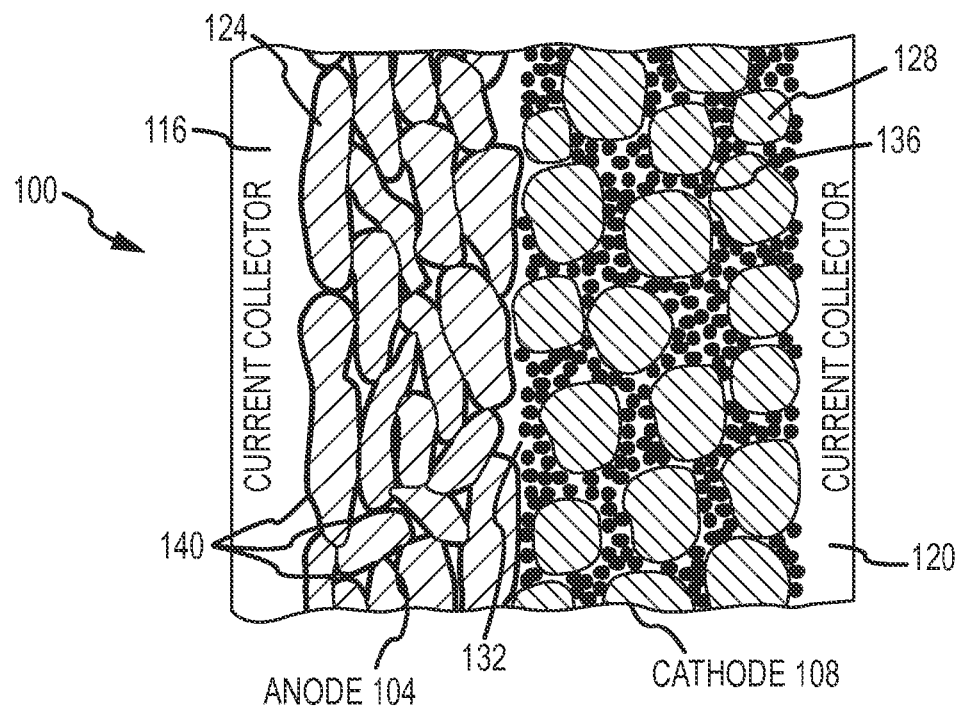
FIG. 1A is a schematic diagram of a separator-free lithium-ion battery having a conformally coated solid electrolyte layer.

FIG. 1A is a schematic diagram of a separator-free lithium-ion battery according to the present disclosure that has a conformal electron insulating and lithium ion conductive solid electrolyte layer deposited on the particle materials of the cathode and anode electrodes. The solid electrolyte layers serve as pseudo-separators and electrically separate the anode and cathode, thereby eliminating the need for the battery to have a conventional polymeric separator. The separator-free lithium-ion battery is generally identified in FIG. 1A with numeral 100. The lithium-ion battery 100 includes an anode electrode 104 and a cathode electrode 108, each comprising a plurality of particles of active materials. The active material of the anode 104 is typically made from carbon. In certain embodiments, graphite may be used as an active material for the anode 104. The active material of the cathode 108 can be made from any layered oxide, polyanion or spinel. In some embodiments, the cathode is made from a material selected from lithium oxide, lithium cobalt oxide, lithium iron phosphate and lithium manganese oxide. In certain embodiments, lithium cobalt oxide may be used as an active material for the cathode 108. Generally, any layer-structured Li[Mn$_x$Ni$_y$Co$_{1-x-y}$]O$_2$ ($0 \leq x \leq 1$, $0 \leq y \leq 1$) may be used as a cathode material. In certain embodiments, the cathode can be made of lithium cobalt oxide, Li[Mn1/3Ni1/3Co1/3]O$_2$ (L333), and combinations thereof. In certain embodiments, the cathode can be made of Li[Ni0.8Co0.15Al0.05]O$_2$ (NCA); Li-excess layer-layer composite Li[Li$_x$Mn$_y$Ni$_z$Co$_{1-x-y-z}$]O$_2$ ($0 \leq x \leq \sim 0.5$, $0 \leq y \leq 1$, $0 \leq z \leq 1$) which can be expressed as xLi$_2$MnO$_3$·yLi[Mn$_a$Ni$_b$Co$_{1-a-b}$]O$_2$ ($0 \leq a \leq 1$, $0 \leq b \leq 1$); Olivine Li[Fe$_x$Mn$_y$Ni$_z$Co$_{1-x-y-z}$]O$_4$ ($0 \leq x \leq 1$, $0 \leq y \leq 1$, $0 \leq z \leq 1$); LiFePO$_4$; and combinations thereof. Cathode materials that can be used in accordance with embodiments disclosed herein are not limited to those typically used in commercial applications, but may also include those materials that are the subject of academic research. In some embodiments, the cathode can be made of sulfur, LiMBO$_3$, Li$_2$MSiO$_4$, LiMFPO$_4$, and combinations thereof.

In the embodiment depicted in FIG. 1A, the anode 104 comprises a plurality of graphite particles 124, and the cathode 108 comprises a plurality of lithium cobalt oxide particles 128. In certain embodiments, the anode 104 and/or the cathode 108 may additionally comprise conductive agents 136 and one or more binders in the interstitial spaces between the electrode particles. The conductive agents 136 can be any electrically conductive material such as, for example, nano-sized carbon having a primary particle size ranging from tens to hundreds of nanometers. Such nano-sized carbon is often referred to as "carbon black." The binders can be any binders used in commercial applications. In certain embodiments, the binders are selected from poly(vinylidinefluoride), which may be optionally processed in N-methyl pyrrolidinone, styrene-butadiene rubbery carboxymethyl cellulose, which may be optionally processed in an aqueous solution, and combinations thereof.

In various aspects, the solid electrolyte layer 140 comprises lithium. Various lithium-containing metal oxides, phosphates, sulfides, and the like may be utilized as the solid electrolyte layer 140 deposited directly on the electrode materials. In some embodiments, the solid electrolyte layer is made of a material selected from $Li^+$ beta alumina, $Li^+$—$Na^+$ beta alumina, lithium lanthanum titanates and combinations thereof. Examples of suitable lithium lanthanum titanates include, without limitation, $((Li,La)_x Ti_y O_z)$, $Li_{1.3}Ti_{1.7}Al_{0.3}(PO_4)_3$, and $Li_{3.6}V_{0.4}Ge_{0.6}O_4$. As described in greater detail below, in certain embodiments the conformal coating of the electrode materials may be accomplished through an atomic layer deposition process. In other embodiments, the solid electrolyte layer 140 can me made by alternate growth of lithium oxide and other metal oxides in the atomic layer deposition process. The deposition method is not restricted to the atomic layer deposition method, but may be any method known in the art which can apply a conformal coating of solid electrolyte materials. In some embodiments, the solid electrolyte layer 140 can be deposited using a method selected from sputtering deposition, thermal evaporation, chemical vapor deposition, and combinations thereof.

In various aspects, the anode 104 and/or the cathode 108 are conformally coated with a solid electrolyte layer 140. In some embodiments, the anode 104 is conformally coated with the layer of solid electrolyte 140. In other embodiments, the cathode 108 is conformally coated with the layer of solid electrolyte 140. In still other embodiments, both the anode 104 and cathode 108 are conformally coated with the layer of solid electrolyte 140. By way of example and not limitation, in the embodiment depicted in FIG. 1A, a solid electrolyte layer 140 coats all of the exposed surfaces of the particles 124 of the anode 104. The solid electrolyte layer 140 allows for bulk transport of lithium ions, while also acting as an electrical insulator. Thus, lithium ions pass through the solid electrolyte layer 140, while the flow of electrons is prevented or substantially inhibited from passing through the solid electrolyte layer 140. In some embodiments, the solid electrolyte layer 140 is thin, having a thickness of about 1-10 microns. In some embodiments, the solid electrolyte layer 140 has a thickness of about 1-5 microns. In some embodiments, the solid electrolyte layer 140 has a thickness of about 1 micron and, in some embodiments, is less than one micron thick. In other embodiments, the solid electrolyte layer 140 can be deposited to a thickness of tens to hundreds of nanometers. In some embodiments, the solid electrolyte layer is deposited to a thickness of about 10-1,000 nm, in some embodiments to a thickness of about 20-500 nm, and in some embodiments to a thickness of about 50-300 nm.

In some embodiments, the solid electrolyte layer 140 is applied in a conformal coating process that causes solid electrolyte material to grow on all, or substantially all, of the exposed surfaces of the particles of the anode 104 and/or cathode 108. During manufacturing, the particles of active material comprising the cathode 108 and/or the anode 104 are contacted with each other and pressed together such that the final electrodes are not solid, but rather have a highly tortuous structure. Spaces between the particles thus form channels and pores through which the solid electrolyte material can penetrate during the conformal coating process. During the conformal coating process, the materials comprising the solid electrolyte layer 140 enter these channels and pores, thereby allowing the solid electrolyte layer 140 to coat all, or substantially all, of the exposed surfaces of the particles that make up the anode 104 and/or cathode 108. As described in greater detail below, in various aspects the conformal coating of the anode 104 and/or cathode 108 may be accomplished through an atomic layer deposition (ALD) process.

The electrodes of the lithium-ion battery 100 are wetted by a liquid electrolyte 132 that provides a medium through which positive charges may move between the anode 104 and the cathode 108. The liquid electrolyte 132 is typically a lithium salt in an organic solvent. In various aspects, the liquid electrolyte 132 can be a mixture of organic carbonates such as, for example, ethylene carbonate or diethyl carbonate, containing complexes of lithium ions. In some embodiments, the liquid electrolyte 132 comprises one or more non-coordinating anion salts such as, for example, lithium hexafluorophosphate, lithium hexafluoroarsenate monohydrate, lithium perchlorate, lithium tetrafluoroborate, lithium triflate, and combinations thereof. In certain embodiments, the organic solvent is selected from acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diethylene glycol dimethyl ether, 1,2-dimethoxy-ethane, dimethylether, dimethyl-formamide, dimethyl sulfoxide, dioxane, ethanol, ethyl acetate, ethylene glycol, glycerin, heptane, hexamethylphosphoramide, hexamethylphosphorous triamide, hexane, methanol, methyl t-butyl ether, methylene chloride, N-methyl-2-pyrrolidinone, nitromethane, pentane, petroleum ether, 1-propanol, 2-propanol, pyridine, tetrahydrofuran, toluene, triethyl amine, water, o-xylene, m-xylene, p-xylene, and combinations thereof. The liquid electrolyte 132 is highly conductive, having a conductivity of approximately $10^{-2}$ S $cm^{-1}$. As a result of electrostatic forces present when the lithium-ion battery 100 charges and discharges, lithium ions move between the anode 104 and the cathode 108 through the liquid electrolyte 132. The conformal solid electrolyte layer 140 allows lithium ions to freely pass through it, thus allowing for bulk transport of lithium ions between the anode and the cathode. Accordingly, when the lithium-ion battery 100 charges and discharges, lithium ions pass through the solid electrolyte layer 140 and, in so doing, move between the liquid electrolyte 132 and the particles of the anode 104 and/or cathode 108.

Charging and discharging also includes movement of electrons into and out of the lithium-ion battery 100. In connection with this movement of electrons, in certain embodiments the lithium-ion battery 100 includes an anode current collector 116 and a cathode current collector 120. In some embodiments, the anode current collector 116 is a conductive layer comprising a conductive metal selected from aluminum, silver, copper and combinations thereof. In some embodiments, the anode current collector 116 is copper. The anode current collector 116 is in contact with the particles of the anode 104 and provides a pathway through which electrons, in the form of an electrical current, may move between the particles of the anode 104 and out of the battery to, for example, an electrical circuit, a charger and/or to another device to which the lithium-ion battery 100 is attached. The cathode current collector 120 is a conductive layer comprising a conductive metal selected from aluminum, silver, copper and combinations thereof. In some embodiments, the cathode current collector 120 is aluminum. The cathode current collector 120 is in contact with the particles of the cathode 108 and provides a pathway through which electrons, in the form of an electrical current, may move between the particles of cathode 108 and an electrical circuit, a charger and/or another device to which the lithium-ion battery 100 is attached. The solid electrolyte layer 140 serves as an electric insulator and prevents electrons from passing through it. Therefore, when the movement of electrons occurs within the battery 100, the solid electrolyte layer 140 forces the flow of electrons to move between the electrodes via the current collectors 116, 120 and simultaneously keeps the flow of electrons away from the liquid electrolyte.

When the lithium-ion battery 100 is charged, lithium ions move from the cathode 108 to the anode 104. In some embodiments, charging the lithium-ion battery 100 may take the form of applying an external voltage such that electrons are removed from the cathode 108 by way of the cathode current collector 120. With removal of the electrons, lithium ions are liberated from the active material of the cathode. As the lithium-ion battery 100 is charged, electrons enter the anode 104 by way of the anode current collector 116. As a result of the charge imbalance, the liberated lithium ions move through the liquid electrolyte 132 and solid electrolyte layer 140 from the cathode 108 to the anode 104 under the influence of electrostatic forces. At the anode 104, the lithium ions become non-covalently bound to the anode by intercalating between the particles of active materials, a process that is reversed when the lithium-ion battery 100 is discharged.

When discharged, the lithium-ion battery 100 is attached to an external load through which electrons move from the anode 104 to the cathode 108. As the electrons are removed from the cathode 104, the intercalation process reverses and the lithium ions are liberated from the anode particles. As the lithium-ion battery 100 is discharged, electrons enter the cathode 108 and create electrostatic forces that cause the liberated lithium ions to move through the liquid electrolyte 132 and solid electrolyte layer 140 back to cathode 108. At the cathode 108, the lithium ions again bind with the active material of the cathode.

In conventional lithium-ion batteries, instabilities may occur at the electrode/electrolyte interface because the composite particles of the electrodes are in direct contact with liquid electrolyte. This direct contact can result in exothermic reactions that generate heat. The heat from these various exothermic reactions at the electrode-electrolyte interface can accumulate, increasing the overall temperature of the battery cell. Once the cell temperature is increased, "thermal runaway" may occur, where the increase in cell temperature changes the conditions in the battery in such a way that causes a further increase in temperature, which can lead to a destructive result such as an electrical explosion or a fire. When this final, catastrophic phase of the self-heating reactions occurs, the conventional lithium-ion battery fails.

In contrast to a conventional lithium-ion battery, the electrically insulating properties of the solid electrolyte layer 140 disclosed herein provides separation between the liquid electrolyte 132 and the electrodes. The conformal solid electrolyte layer 140 acts as a protective layer and may prevent or substantially mitigate exothermic reactions at the electrode-electrolyte interface that occur in conventional lithium-ion batteries. In this way, the solid electrolyte layer 140 prevents heat from accumulating in the battery 100 and, in so doing, avoids the problem of "thermal runaway" that can lead to failure in conventional lithium-ion batteries.

Additionally, in conventional lithium ion-batteries, failure can result from internal short circuits. For example, the unwanted introduction of tiny metal particles into the cell and/or mechanical deformation of the cell can create internal conductive pathways. When these internal conductive pathways extend between the anode and the cathode, an internal short circuit results. In some cases, internal short circuits and interfacial reactions may interact to cause battery failure. For example, once an internal short circuit occurs, large amounts of current flow through the internal short circuit rather than the circuit path, causing localized heating of the cell. If this localized heating increases to the point where the battery cell temperature increases, the interfacial exothermic reaction is accelerated, triggering thermal runaway, which, as stated above, can lead to destructive results.

Figure 1B:
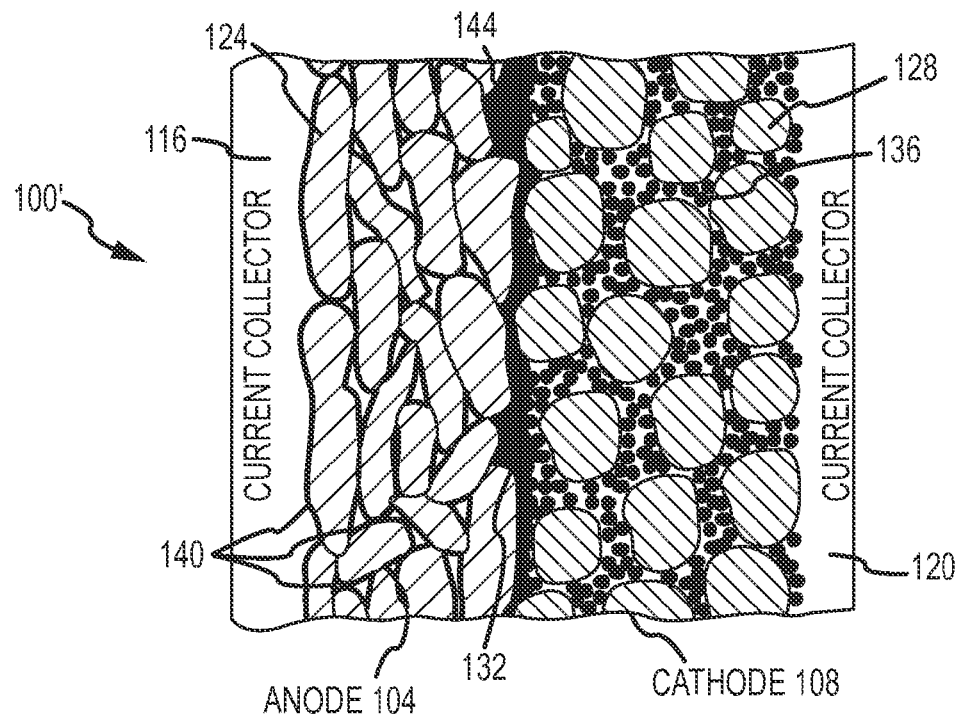
FIG. 1B is a schematic diagram of a separator-free lithium-ion battery having a conformally coated solid electrolyte layer and an electrically insulating layer on the outer surface of the anode and cathode.

In contrast to a conventional lithium-ion battery, the conformal solid electrolyte layer 140 disclosed herein provides electrical separation between the anode 104 and cathode 108 electrodes. The conformal solid electrolyte layer 140 acts as a protective layer and may prevent or substantially mitigate the creation of internal short circuits in the disclosed batteries 100. Additionally, in some embodiments the outer surfaces of the anode 104 and cathode 108 may be deposited with a thick, electrically insulating, lithium ion conductive coating to ensure complete electrical separation of the anode 104 and cathode 108. FIG. 1B is a schematic diagram of a lithium-ion battery according to the present disclosure that utilizes a conformal solid electrolyte layer and an electrically insulating layer on the very surface of the anode 104 and cathode 108. The lithium-ion battery is identified in FIG. 1B with numeral 100' and the electrically insulating layer is identified with numeral 144. In certain embodiments, the electrically insulating layer 144 comprises lithium. Various lithium-containing metal oxides, phosphates, sulfides, and the like may be utilized as the electrically insulating layer 144 deposited directly on the outer surface of the electrodes. In some embodiments, the electrically insulating layer 144 is made of a material selected from $Li^+$ beta alumina, $Li^+$—$Na^+$beta alumina, lithium lanthanum titanates and combinations thereof. Examples of suitable lithium lanthanum titanates include, without limitation, $((Li,La)_xTi_yO_z)$, $Li_{1.3}Ti_{1.7}Al_{0.3}(PO_4)_3$, and $Li_{3.6}V_{0.4}Ge_{0.6}O_4$. Imperfections that might lead to internal short circuits in a conventional lithium-ion battery do not do so in the lithium-ion battery 100' because the electrically insulating layer 144 prevents the formation of internal short circuits and thus avoids the internal flow of electrons between the anode 104 the and cathode 108. The thickness of the electrically insulating layer 144 may range from approximately 200 nm to approximately 5 μm. The electrically insulating layer 144 may be applied to the outer surfaces of the electrodes by deposition methods such as, for example, sputtering, thermal evaporation, and other appropriate methods.

LIB Systems Having a Solid Electrolyte Layer and a Polymeric Separator

Figure 2A:
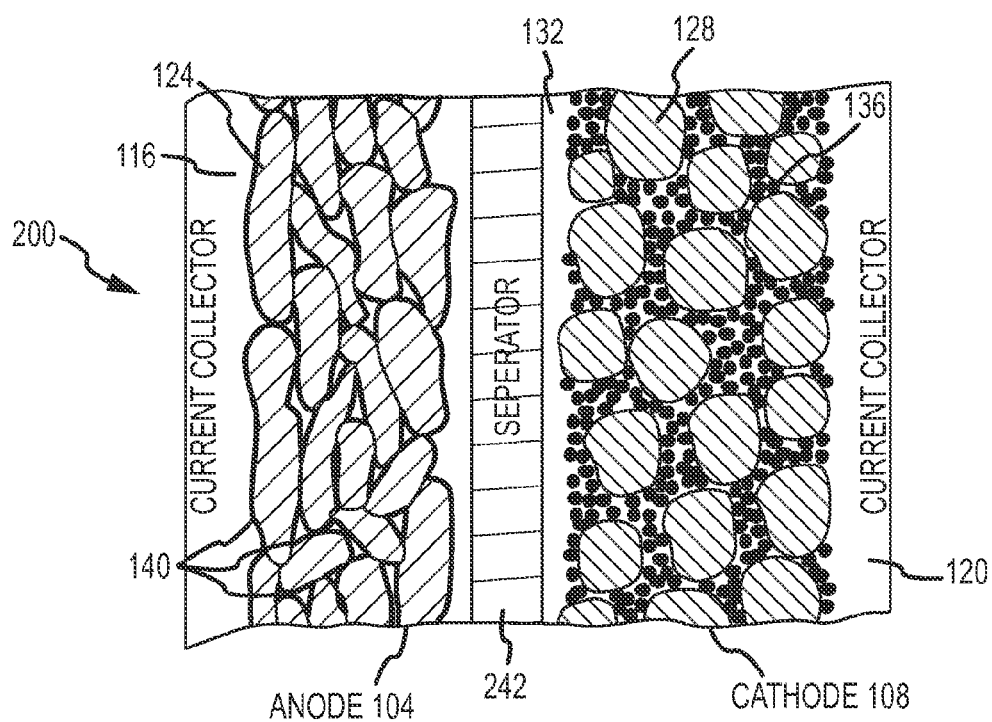
FIG. 2A is a schematic diagram of a lithium-ion battery having a conformally coated solid electrolyte layer and a polymer separator.

FIG. 2A is a schematic diagram of a lithium-ion battery according to the present disclosure that utilizes a conformal electron insulating and lithium ion conductive solid electrolyte layer on the particle materials of the cathode and anode. The lithium-ion battery is identified in FIG. 1A with numeral 200 and the conformal solid electrolyte layer is identified with numeral 140. In addition to the solid electrolyte layer 140, the lithium-ion battery 200 includes a polymeric separator 212. The polymeric separator 212 is permeable to lithium ions so as to allow flow of lithium ions between the anode 104 and the cathode 108 during charging and discharging of the lithium-ion battery 200.

A polymeric separator is a battery element that is used in conventional lithium-ion batteries to guard against internal short circuits by preventing the electrodes from coming into direct contact. In a conventional lithium-ion battery, catastrophic failure can result from failure of the polymeric separator. Specifically, local overheating may lead to melting and shrinking of the polymeric separator, which can result in direct contact between the cathode and anode. Battery failure can then occur via thermal runaway and/or internal short circuits (when the cathode and the anode are no longer electrically separated).

In the embodiment depicted in FIG. 2A, a polymeric separator 212 may be employed in addition to a solid electrolyte layer 140 coating the particles 124,128 of the cathode 108 and/or anode 104. The addition of the solid electrolyte layer 140 generally creates redundancy within the battery 200 that can significantly mitigate the possibility of thermal runaway and/or internal short circuits due to polymer separator failure. Because it is impervious to electrons, the solid electrolyte layer 140 acts as an electron resistor. Even if failure of the polymeric separator 212 were to occur, the solid electrolyte layer 140 may provide a highly resistive electrical insulation that maintains the electrical separation of the cathode 108 and the anode 104. The polymeric separator 212 can be made of any suitable material for use in lithium-ion batteries. In some embodiments, the polymeric separator 212 is polyolefin based and has a semi-crystalline structure. In some embodiments, the polymeric separator 212 is made from a material selected from polyethylene, polypropylene, polyethylene-polypropylene copolymer, poly(methyl methacrylate), poly(vinylidene fluoride), polytriphenylamine, and combinations thereof.

Because the solid electrolyte layers 140 are thin, their use in combination with a polymeric separator 212 does not cause any significant loss in battery 100 kinetics as compared to a conventional lithium-ion battery. Therefore, even though lithium ion transport within the battery 200 includes passage across both the polymeric separator 212 and the solid electrolyte layers 140, the rate capability of the disclosed battery 200 is comparable to that of conventional lithium-ion batteries utilizing only polymeric separators. Therefore, the conformal protective solid electrolyte layers 140 may provide the added safety of mitigating the creation of internal short circuits and/or thermal runaway, while maintaining battery 200 kinetics.

Figure 2B:
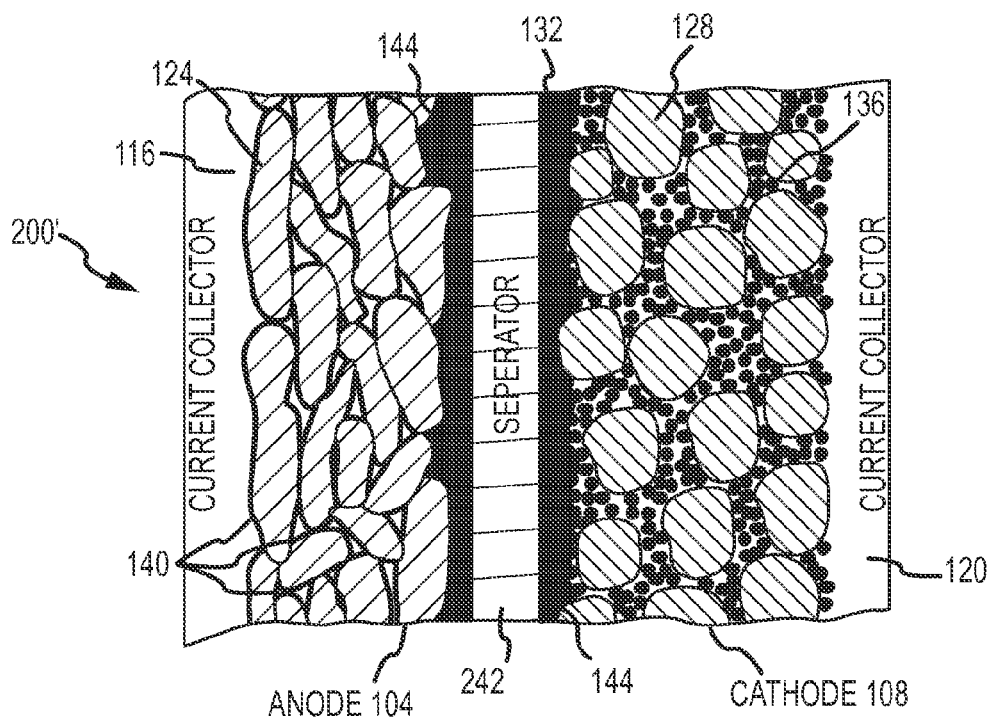
FIG. 2B is a schematic diagram of a lithium-ion battery having a conformally coated solid electrolyte layer, a polymer separator, and an electrically insulating layer on the outer surface of the anode and cathode.

In the embodiment depicted in FIG. 2A, a polymeric separator 212 is employed in combination with a conformal solid electrolyte layer 140 to provide a redundancy that can maintain electrical separation between the cathode 108 and anode 104 in the event of failure of the polymeric separator during battery 200 operation. FIG. 2B is a schematic diagram of a lithium-ion battery 200' according to the present disclosure that utilizes a polymeric separator 212, conformal solid electrolyte layers 140 deposited on the electrodes, and thick electrically insulating layers 144 deposited on the outer surface of the anode 104 and cathode 108. As described above, the electrically insulating layers 144 ensure complete electrical separation of the anode 104 and cathode 108.

Conformal Coating with Atomic Layer Deposition

In various aspects, atomic layer deposition (ALD) can be used to form the conformal solid electrolyte layer 140. ALD is a vapor phase deposition technique that grows films one atomic layer at a time, resulting in conformal thin films deposited with precise thickness control. The use of ALD is advantageous in that it is a self-limiting reaction. Therefore, the use of ALD avoids problems encountered by vapor techniques such as chemical vapor deposition that are not self-limiting reactions, wherein the resulting film thickness becomes varied due to the generation of pore structures. The resulting films are typically not uniform through the cross-section of the electrode which can impact battery performance. In contrast, an ALD coating can be applied uniformly to all of the exposed surfaces of the particles of the electrodes. The conformal solid electrolyte layers deposited by ALD according to the present disclosure can significantly improve the durability of the electrode active materials for lithium-ion batteries.

Typically, a single cycle of an ALD reaction includes the separate exposure of a vaporized metallic precursor and water vapor. First, a vaporized metallic precursor is contacted with the particles of an electrode such that the metallic precursor reacts with a functional group present on the exposed surfaces of the particles of an electrode. In some embodiments, the functional group is a hydroxyl group. Then water vapor is contacted with the particles of the electrode. The water reacts with the metallic-precursor-reacted surface layer, forming a single layer of solid electrolyte. The ALD reaction is therefore self-limiting in that once the functional group is no longer available for reaction with the metallic precursor, the reaction stops. Utilization of ALD according to the present disclosure can result in conformal solid electrolyte layers because the precursor products are introduced in vapor form. The vapors comprise materials that are small enough to enter into the tortuous structure of an electrode and make contact will all, or substantially all, of the exposed surfaces of the particles comprising an electrode. In certain embodiments, lithium oxide ALD films can be made using lithium tert-butoxide and water.

In some embodiments, lithium-containing ALD films can be prepared by alternately applying lithium oxide and metal oxide subcycles to the electrode particles. In such embodiments, one or more subcycle applications combine to form a single cycle of an ALD reaction. For example, in making a LiAlxOy ALD film, a first lithium oxide ALD subcycle and a second aluminum oxide ALD subcycle, both of which use trimethyl aluminum as a metallic precursor, can be alternately applied within a single ALD cycle. The fraction of lithium/aluminum can be tuned by the sequences of the subcycles. In certain embodiments, lithium lanthanum titanates can be grown by alternately applying lithium oxide, lanthanum oxide $(La(thd)_3$ (thd=2,2,6,6-tetramethyl-3,5-heptanedione)+ozone), and titanium dioxide $(TiCl_4$+water) subcycles. In certain embodiments, the solid electrolyte layers can also be made via ALD according to the following references: J. Mater. Chem. 2010, 20, 2877. J. Mater. Chem. 2009, 19, 8767.

In some embodiments, a pretreatment process may be applied to the particles of an electrode prior to initiation of ALD in order to generate the proper functional group along the exposed surfaces of the particles. Usually, the reaction of the metal oxide with the exposed surfaces of the electrode particles occurs via a functional group located on the exposed surfaces of the particles where the ALD reaction can be initiated. However, some electrode materials lack the proper functional group required for initiation of the ALD reaction. Therefore, in some embodiments, a nitrogen dioxide/trimethyl aluminum pretreatment may be applied to the exposed surfaces of the electrode particles in order to achieve maximum coverage of the ALD coating. When this pretreatment formulation is applied, the exposed surfaces of the electrode particles can be covered by a nitrogen dioxide/trimethyl aluminum layer, which can then act as the reactive surface for other ALD reaction cycles and/or further ALD subcycles such as, for example, trimethyl aluminum/water subcycles.

ALD can be used to deposit a conformal solid electrolyte layer 140 directly onto preformed electrode materials that already contain a cathode current collector 120 or an anode current collector 116. The use of ALD in this manner avoids having to coat the particles of active materials comprising the electrodes prior to final assembly of the electrodes. Therefore, all of the exposed surfaces of the cathode 108 and the anode 104 active materials, the conductive additives 136 and the binders in the electrodes are conformally covered with an electron insulating solid electrolyte layer. However, the solid electrolyte layer 140 is not grown along the originally formed electrical contacts between the particles of active materials, the conductive additives, or the current collectors. Therefore electrical contact remains undisturbed in the preformed electrodes after deposition of the solid electrolyte layer. These uncoated areas continue to provide an electron transfer pathway through the porous electrodes to insure electrical contact to the current collectors 116, 120.

In some embodiments, a calendaring process may be applied to the particles of active material comprising an electrode during manufacturing, thereby maximizing the loading density of the particles of active materials comprising the electrodes. During the calendaring process, the particles are pressed together while being heated under pressure. ALD can then be utilized to apply a conformal solid electrolyte layer to the resulting electrode. However, because the calendaring process can minimize the porosity of the resulting electrode, in some embodiments ALD can be applied before the calendaring process.

While a number of aspects and embodiments have been disclosed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A hybrid solid-liquid electrolyte lithium-ion battery comprising:
    an anode comprising a plurality of particles of an anode active material, wherein the plurality of particles is conformally coated with a first solid electrolyte layer;
    a cathode comprising a plurality of particles of a cathode active material, wherein the plurality of particles is conformally coated with a second solid electrolyte layer; and
    a liquid electrolyte in contact with the anode and the cathode,
    wherein the first and second solid electrolyte layers comprise lithium and are electrically insulating and lithium ion conductive.

2. The battery of claim 1, wherein the first and second solid electrolyte layers have a thickness of between 1 and 10 microns.

3. The battery of claim 1, wherein the anode or the cathode further comprises a conductive agent.

4. The battery of claim 1, wherein the first and second solid electrolyte layers comprise a material selected from $Li^+$ beta alumina, $Li^+$—$Na^+$ beta alumina, $(Li,La)_xTi_yO_z$, $Li_{1.3}Ti_{1.7}Al_{0.3}(PO_4)_3$, $Li_{3.6}V_{0.4}Ge_{0.6}O_4$, and combinations thereof.

5. The battery of claim 1, wherein the first and second solid electrolyte layers comprise a lithium-containing metal oxide.

6. The battery of claim 1, wherein the first and second solid electrolyte layers electrically separate the anode and the cathode.

7. The battery of claim 1, further comprising a polymeric separator between the anode and the cathode.

8. The battery of claim 1, wherein the anode active material comprises graphite.

9. The battery of claim 1, wherein the cathode active material comprises lithium oxide, lithium cobalt oxide, lithium iron phosphate or lithium manganese oxide.

10. The battery of claim 1, wherein the liquid electrolyte comprises a lithium salt in an organic solvent.

11. The battery of claim 10, wherein the lithium salt is selected from lithium hexafluorophosphate, lithium hexafluoroarsenate monohydrate, lithium perchlorate, lithium tetrafluoroborate, lithium triflate, and combinations thereof.

12. The battery of claim 1, wherein the anode active material comprises carbon.

13. A hybrid solid-liquid electrolyte lithium-ion battery comprising: an anode comprising a plurality of particles of an anode active material, wherein the plurality of particles is conformally coated with a first solid electrolyte layer; a cathode comprising a plurality of particles of a cathode active material, wherein the plurality of particles is conformally coated with a second solid electrolyte layer; and
    a liquid electrolyte in contact with the anode and the cathode,
    wherein the first and second solid electrolyte layers comprise a material selected from $Li^+$ beta alumina, $Li^+$-$Na^+$ beta alumina, $(Li,La)_xTi_yO_z$, $Li_{1.3}Ti_{1.7}Al_{0.3}(PO_4)_3$, $Li_{3.6}V_{0.4}Ge_{0.6}O_4$, and combinations thereof, and wherein the first and second solid electrolyte layers are electrically insulating and lithium ion conductive.

14. A method of making a separator-free lithium ion battery, comprising:
    conformally coating an anode comprising a plurality of particles of an anode active material with a first solid electrolyte layer by atomic layer deposition;
    conformally coating a cathode comprising a plurality of particles of an cathode active material with a second solid electrolyte layer by atomic layer deposition; and
    contacting the anode and the cathode with a liquid electrolyte,
wherein the first and second solid electrolyte layers comprise lithium and are electrically insulating and lithium ion conductive.

15. The method of claim 14, wherein the anode or the cathode is preformed and comprises an anode current collector or a cathode current collector.

16. The method of claim 14, wherein the first and second solid electrolyte layers are deposited at a thickness of about 1-5 microns.

17. The method of claim 14, wherein the anode is contacted with nitrogen dioxide and trimethyl aluminum prior to atomic layer deposition.

18. The method of claim 17, wherein the first and second solid electrolyte layers comprise a lithium oxide film and the atomic layer deposition comprises contacting the anode and the cathode with lithium tert-butoxide and water.

19. The method of claim 17, wherein the first and second solid electrolyte layers comprise lithium lanthanum titanate.

20. The method of claim 19, wherein the atomic layer deposition comprises alternately contacting the anode and cathode with lithium oxide, lanthanum oxide and titanium dioxide. A hybrid solid-liquid electrolyte lithium-ion battery comprising:
    an anode comprising a plurality of particles of an anode active material, wherein the plurality of particles is conformally coated with a first solid electrolyte layer;
    a cathode comprising a plurality of particles of a cathode active material, wherein the plurality of particles is conformally coated with a second solid electrolyte layer; and a liquid electrolyte in contact with the anode and the cathode, wherein the first and second solid electrolyte layers comprise a material selected from $Li^+$ beta alumina, $Li^+$—$Na^+$ beta alumina, $(Li,La)_x Ti_y O_z$, $Li_{1.3}Ti_{1.7}Al_{0.3}(PO_4)_3$, $Li_{3.6}V_{0.4}Ge_{0.6}O_4$, and combinations thereof, and wherein the first and second solid electrolyte layers are electrically insulating and lithium ion conductive.

* * * * *